United States Patent
Agnoni et al.

(10) Patent No.: US 8,510,410 B2
(45) Date of Patent: Aug. 13, 2013

(54) METHOD AND DEVICE FOR ACCESS TO A DIRECTORY

(75) Inventors: Francesco Agnoni, Cori (IT); Pietro Picaro, Formia (IT); Massimo Iovene, Naples (IT); Karen Elisabeth Nielsen, Hoejbjerg (DK); Luca Lucarini, Ciampino (IT); Alessandro Mattioli, Bussero (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 12/935,974

(22) PCT Filed: Apr. 4, 2008

(86) PCT No.: PCT/EP2008/054102
§ 371 (c)(1),
(2), (4) Date: Dec. 13, 2010

(87) PCT Pub. No.: WO2009/121417
PCT Pub. Date: Oct. 8, 2009

(65) Prior Publication Data
US 2011/0082911 A1    Apr. 7, 2011

(51) Int. Cl.
*G06F 15/16* (2006.01)
(52) U.S. Cl.
USPC ............ 709/217; 709/223; 709/229; 705/309
(58) Field of Classification Search
USPC ...................... 709/217, 223, 229; 705/309
See application file for complete search history.

(56) References Cited

U.S. PATENT DOCUMENTS

| | | | | |
|---|---|---|---|---|
| 5,214,768 A | * | 5/1993 | Martin et al. | 711/114 |
| 5,870,733 A | * | 2/1999 | Bass et al. | 1/1 |
| 6,353,878 B1 | * | 3/2002 | Dunham | 711/162 |
| 6,445,775 B1 | * | 9/2002 | Morganstein et al. | 379/88.02 |
| 6,456,698 B1 | * | 9/2002 | Morganstein et al. | 379/88.02 |
| 7,246,238 B2 | * | 7/2007 | Mullen et al. | 713/175 |
| 7,249,379 B2 | * | 7/2007 | Larsen | 726/22 |
| 7,613,724 B1 | * | 11/2009 | Santry et al. | 1/1 |
| 2002/0147604 A1 | * | 10/2002 | Slate et al. | 705/1 |
| 2003/0041147 A1 | | 2/2003 | van den Oord et al. | |
| 2003/0067912 A1 | | 4/2003 | Mead et al. | |

(Continued)

FOREIGN PATENT DOCUMENTS

| JP | 4160665 A | 6/1992 |
|---|---|---|
| JP | 11110216 A | 4/1999 |

(Continued)

*Primary Examiner* — Wing F Chan
*Assistant Examiner* — Tesfay Yohannes
(74) *Attorney, Agent, or Firm* — Coats and Bennett, P.L.L.C.

(57) ABSTRACT

A method is described for access to a directory by an application (410). A function library (412) handles a first request from the application for fetching the information from a server. The first request is forwarded from the function library (412) to the server by a client module (414). A request identifier (420) is sent from the function library to the application when the first request is forwarded to the server. A response signal (422) to the first request is sent from the server and received by the application. The response signal comprises a response identifier. The response identifier is checked to match the response signal (422) to the first request. A function from the function library is called (424) by the application for decoding the response signal. The decoded response signal is returned (426) from the function library to the application. A device and a program are also described.

8 Claims, 5 Drawing Sheets

(56) References Cited

U.S. PATENT DOCUMENTS

| | | | |
|---|---|---|---|
| 2005/0044381 A1* | 2/2005 | Larsen et al. | 713/182 |
| 2006/0031185 A1* | 2/2006 | Jose et al. | 707/1 |
| 2006/0140386 A1* | 6/2006 | Morganstein et al. | 379/224 |
| 2006/0253506 A1 | 11/2006 | Jog et al. | |

FOREIGN PATENT DOCUMENTS

| | | |
|---|---|---|
| JP | 2001084198 A | 3/2001 |
| JP | 2003067356 A | 3/2003 |
| JP | 2005293407 A | 10/2005 |
| JP | 2006351044 A | 12/2006 |

* cited by examiner

METHOD AND DEVICE FOR ACCESS TO A DIRECTORY

TECHNICAL FIELD

The present invention relates to a method according to the preamble of claim 1. Devices and software programs embodying the invention are also described.

BACKGROUND

A directory is a set of objects organized in a logical and hierarchical manner. A common example of a directory is a telephone directory, which consists of a series of names, e.g. of persons or organizations, organized alphabetically, with each name having an address and phone number attached. A directory can be regarded as a tree of entries also regarded as directory information tree, or simply directory tree, due to the fact that data is represented in a hierarchical tree-like structure. The data in a directory can be managed by directory services.

Modifications and queries in a directory can be made using application protocols like the Lightweight Directory Access Protocol (LDAP). LDAP is a directory service protocol running over the Transmission Control Protocol (TCP) and the Internet Protocol (IP), commonly known as TCP/IP. LDAP is based on a client-server model in which a client makes a TCP connection to an LDAP server, over which it sends requests and receives responses. One or more LDAP servers contain the data making up the LDAP directory. In case of a distributed directory, regardless of which LDAP server a client connects to, it has the same view of the directory; a name presented to an LDAP server references the same entry it would on another LDAP server.

The LDAP directory service model is based on entries. An entry is a collection of attributes that has a name, called a distinguished name, which refers to the entry unambiguously. Each of the entry's attributes has a type and one or more values. The types are typically mnemonic strings, like "en" for common name, or "mail" for email address. The values depend on the attribute type. In LDAP, directory entries are arranged in a hierarchical tree-like structure that can reflect e.g. geographic or organizational boundaries.

LDAP defines operations for interrogating and updating the directory. For example, operations are provided for adding and deleting an entry from the directory, changing an existing entry, and changing the name of an entry. LDAP is mostly used to search for information in the directory. The LDAP search operation allows a part of the directory to be searched for entries that match criteria specified by a search filter. Information can then be requested from an entry that matches the criteria.

The specification of the LDAP client source code interface described in "The C LDAP Application Program Interface, draft-ietf-Idapext-Idap-c-api-05.txt, 2000", defines two kinds of operations on the LDAP Application Program Interface (API), instantiated by the provisioning of two groups of function calls, named "asynchronous" and "synchronous" function calls, respectively. Synchronous function calls block the application, e.g. a computer program, making a request to the directory and do not return to it until the LDAP server has served the request and returned a result. On the other hand, asynchronous functions return to the application as soon as the LDAP client processes the request, and the application can then continue its operation.

There are applications where a big number of requests have to be handled in a short time. For example in telecommunication applications there are cases when a lot of search requests have to be served. The operation of both synchronous and asynchronous functions has a drawback as they do not allow reaching the required throughput in such cases. This happens because regardless of which of the two functions are used, the processing of each request needs to first be finished by all protocol layers which are active in the process (LDAP, TCP/IP) before a next request can be sent. Moreover in the asynchronous case the application needs to regularly perform checks for determining when there are results coming from the server that need to be fetched.

SUMMARY

It is an object of the present invention to obviate the above disadvantages and provide an advantageous method for access to a directory.

According to the invention, the method described in claim 1 is performed. Furthermore, the invention is embodied in a device and a program as described in the further independent claims. Embodiments of the invention are described in the dependent claims.

A method for accessing information in a directory by an application is proposed. A function library handles a first request from the application for fetching the information from a server. The first request is forwarded from the function library to the server by a client module. Further a request identifier is sent from the function library to the application and to the server when the first request is forwarded to the server. A response signal is received from the server to the first request made by the application. The response signal comprises a response identifier which is the same with the request identifier sent by the client to the server. The response identifier is then checked in order to match the response to the first request and the application calls a function from the function library to decode the response signal. Finally the decoded response signal is returned from the function library to the application.

Furthermore, the invention can be embodied in a device for accessing information in a directory. The device comprises a processing unit, which is adapted to execute at least one application and send a first request for information to a server, and a function library unit containing at least one function for handling the first request from the application. The device further comprises a client module unit for forwarding the first request from the application to the server. The function library unit further comprises means for assigning a request identifier to the first request and an interface adapted to forward the request identifier to the application when the first request to the server is forwarded and a decoder for decoding a response signal to the first request is received by the processing unit. The processing unit comprises an interface which is adapted to receive a response signal comprising a response identifier from the server, a memory for storing the request identifier and a comparator unit which is adapted to compare the response identifier to the request identifier for matching the response to the first request.

The method can also be embodied in a program which is for example stored on a data carrier or loadable into a processing system of a device, e.g. as a sequence of signals.

The proposed method and devices allow an advantageous access to a directory while avoiding low performance in serving a high amount of search requests.

The foregoing and other objects, features and advantages of the present invention will become more apparent in the following detailed description of preferred embodiments as illustrated in the accompanying drawings.

DETAILED DESCRIPTION

In the following, the invention is described making reference to its application on LDAP. However the proposed method is not restricted to LDAP and can be used in other directory access protocols.

Figure 1:
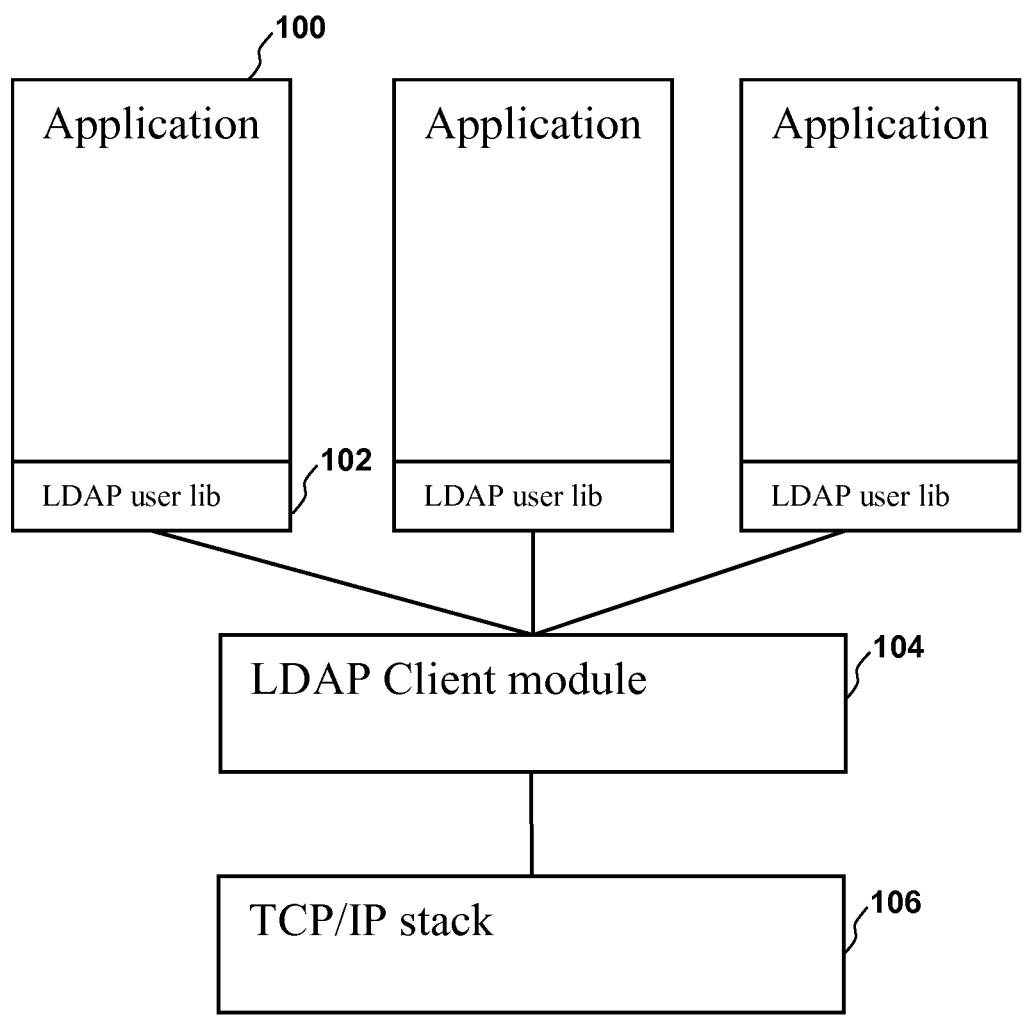
FIG. 1 shows a high-level depiction of an LDAP client.

FIG. 1 shows a high-level depiction of the architecture of an LDAP client. One or more applications 100, e.g. computer programs, communicate with an LDAP client module 104 which implements the LDAP protocol mechanism. The LDAP client module communicates with the TCP/IP stack 106 in order to further communicate with remote servers on behalf of the applications. The applications communicate with the LDAP client module through the means of an LDAP user library 102, which is provided to the applications as part of the LDAP functionality. The LDAP user library is a collection of subprograms which are used to develop and implement LDAP services. The LDAP API allows access to the LDAP user library, providing function calls for communication between the application and the LDAP Client module.

Figure 2A:
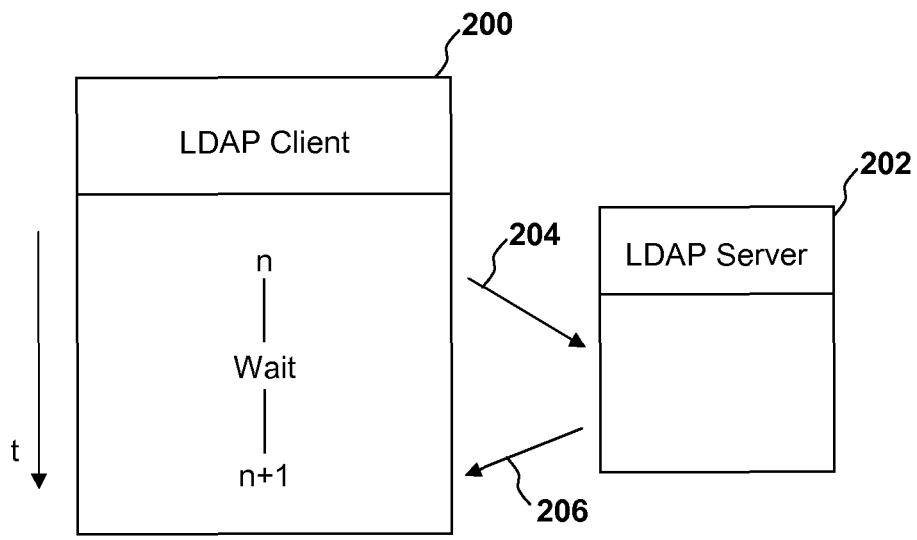
FIG. 2a shows a synchronous operation mode in an LDAP client in the prior art.

FIG. 2a shows a high level view of the synchronous operation mode in an LDAP client 200 in the prior art. In synchronous operation an application making a request 204 to the directory is blocked from further operation until the LDAP server 202 has served the request and returned a result 206. After that further operation of the application is resumed. This means that the application cannot proceed to step n+1 in order to execute other tasks or send more requests until a previous request has been served and a result has been returned to the application.

Figure 2B:
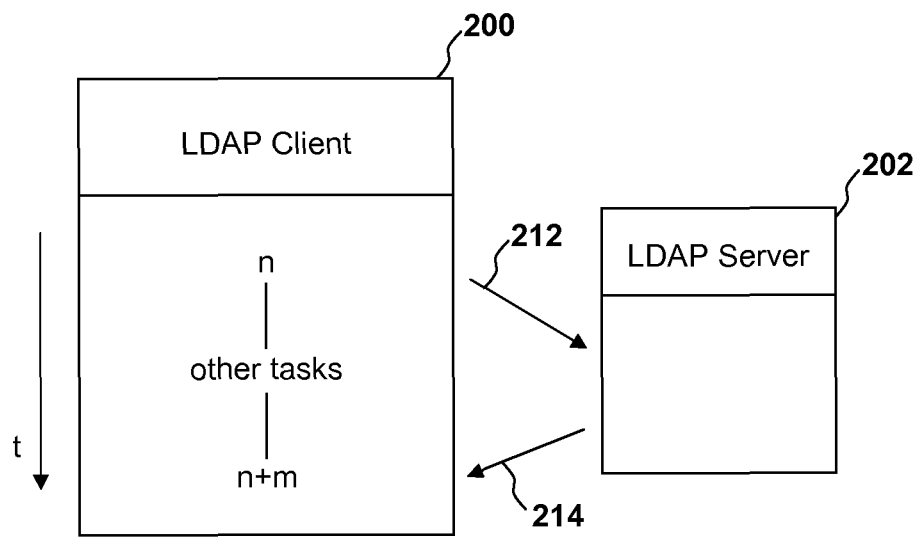
FIG. 2b shows an asynchronous operation mode in an LDAP client in the prior art.

FIG. 2b shows an overview of the asynchronous operation mode in an LDAP client 200 in the prior art. In asynchronous operation, asynchronous functions allow further operation of the application as soon as the LDAP server 202 processes the request. In this way the application can continue to further steps n+m and execute other tasks as soon as the request has been sent 212 to the LDAP server. In order to receive the response 214 the application needs to perform regular checks for determining if the response arrived from the server.

Figure 3:
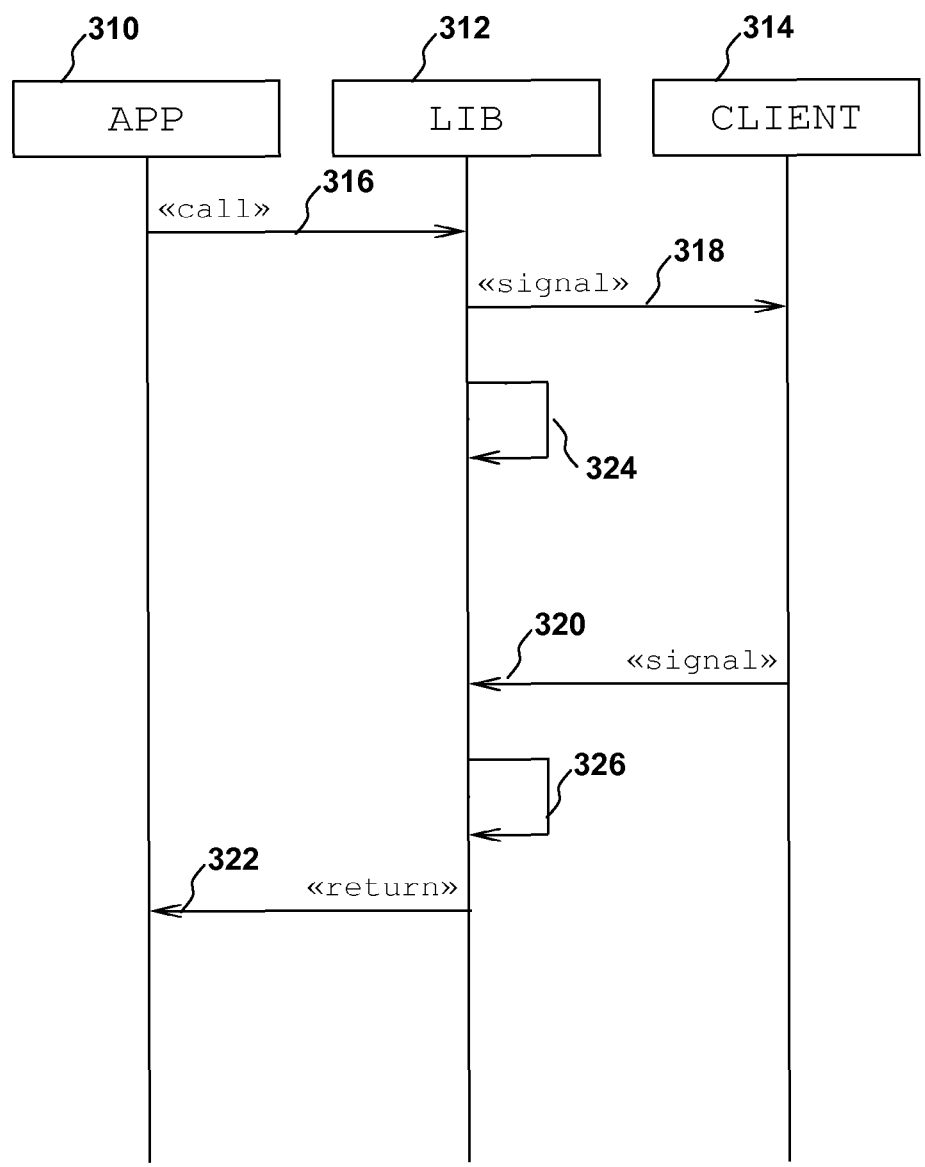
FIG. 3 shows a signaling diagram of a blocking asynchronous interaction.

FIG. 3 shows a signaling diagram of the operation of an asynchronous operation mode. The application 310 calls 316 an asynchronous function in the user library 312. The library, in turn, allocates a signal 318 and sends on the request to the LDAP Client module 314. When the request is sent, the library blocks 324 further requests from the application. When the processing of the request is over, a response signal is sent from the server to the LDAP client module which further sends the response signal 320 to the library. The response signal is decoded 326 by the library and subsequently the outcome of the operation is returned to the application with the return 322 of the function call. In the meantime, the application is blocked. For this reason the mode described is called blocking asynchronous operation mode and the function is called blocking asynchronous function.

In both modes described above the application making a request cannot send a new request until the previous one has been served. There is a difference though between the two operation modes since in the synchronous operation the application is blocked from executing further tasks while in the asynchronous operation the application is free to perform further tasks. The fact that in both operation modes no further requests can be sent until a previous request has been served introduces restrictions in cases when there is a need for serving a high number of requests. In order to allow LDAP functionality in cases when many requests need to be served in a short time, e.g. in telecom applications, a new group of non-blocking, truly asynchronous function calls are based on asynchronous function calls used in the asynchronous operation mode of the LDAP client without need to regularly perform checks for determining when there are results coming from the server that need to be fetched, is proposed. The proposed function calls allow the application to make further requests before a previous request has been served. In comparison to the asynchronous operation mode found in the prior art, a higher number of requests can be served.

Figure 4:
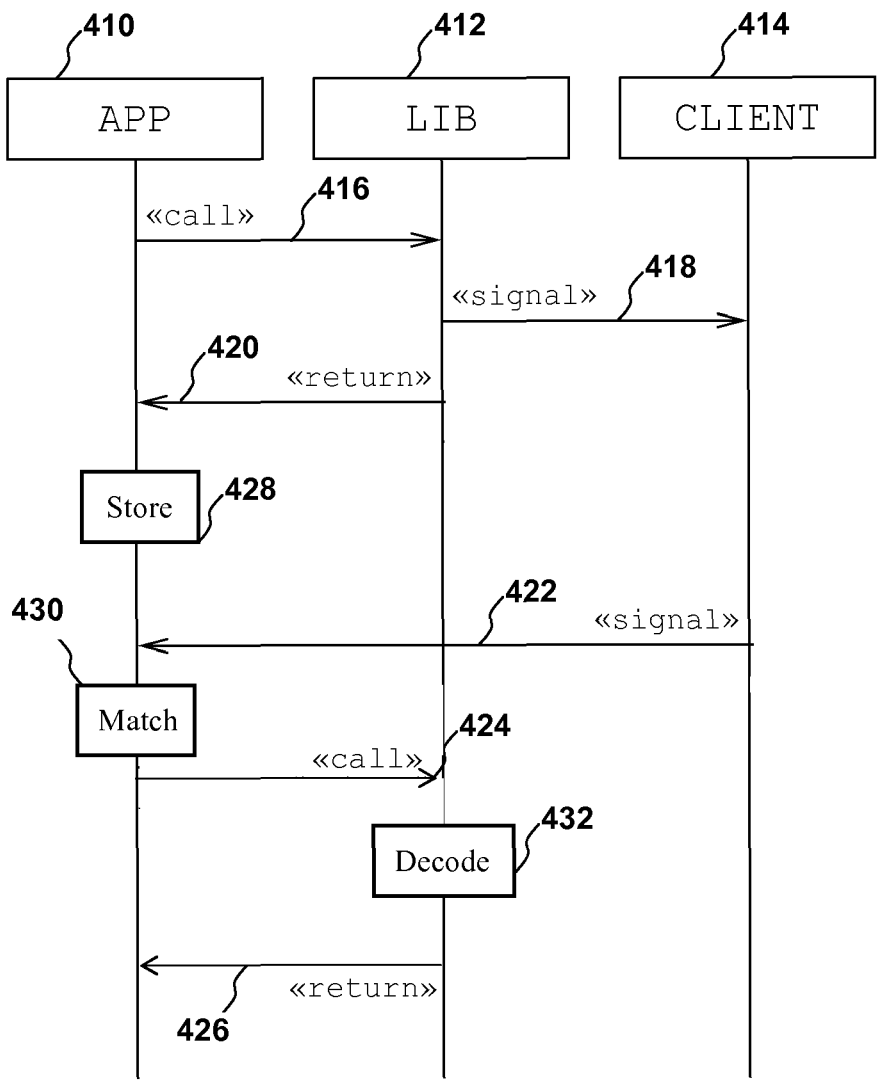
FIG. 4 shows a signaling diagram of a non-blocking asynchronous interaction.

An embodiment of the operation of the proposed non-blocking asynchronous interaction mode is shown in the signaling diagram of FIG. 4. The application 410 makes a request by calling 416 a non-blocking asynchronous function in the user library 412. This in turn allocates a signal 418 and sends on the request together with a request identifier to the LDAP client module 414. The function call returns 420 to the application with the request identifier. This request identifier is also sent from the LDAP client module to the server. The request identifier provides an identity of the request sent from the user library to the LDAP client module and can contain information about the specific request e.g. the relation of the request to a communication session with the LDAP client. After an LDAP server has processed the request made by the application, it sends a response signal together with a response identifier to the LDAP client which further sends it 422 to the application. The response signal contains an answer to the request made by the application. The response identifier is the same with the request identifier sent by the client module to the server. The application does not need to regularly perform checks for determining when there are results coming from the server that need to be fetched in particular if it receives the response signal in its signal queue. The signal queue is the input point for signals received by the application from processes that it interacts with. The response signal is processed by the application's signal processing code which analyzes and attempts to interpret the response signal. The analysis and interpretation of the response signal allows the application to recognize it as relating to interactions with the LDAP client module. For example, the request identifier can be used to recognize this relation. The identifier can include a label signifying signals originating from the LDAP client. Any signal coming from the LDAP servers is encoded and thus its content is not readable by the application. For this reason the application calls 424 an LDAP user library function in order to decode 432 the contents of the signal. Following that the library returns 426 the result of the operation to the application. This result is the reply to the request made by the application.

In an embodiment, associations of requests made by the application and the corresponding request identifiers returned to the application can be stored 428 by the application. The associations can be used to match 430 the responses sent from the LDAP server with the requests made by the application.

In another embodiment, the LDAP function library includes functions enabling a non-blocking, asynchronous processing of further requests made by an application.

Figure 5:
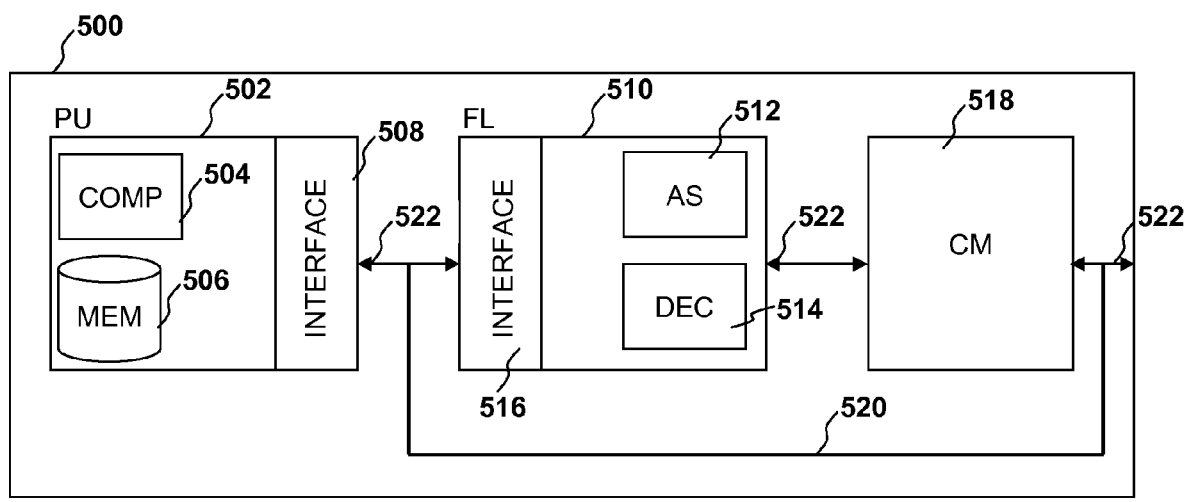
FIG. 5 shows a device which is adapted to perform the proposed method.

The invention can also be embodied in a device 500 which can be adapted to perform any embodiments of the method as described above. An embodiment of such a device is shown in FIG. 5. It comprises a processing unit 502 which is adapted to execute an application which sends requests for information to a server through a communication interface 508 which is also adapted to receive a response signal with a response identifier from the server. The processing unit comprises also a memory 506 adapted to store the request identifier and a comparator 504 which is adapted to match the responses to the requests made by the application by comparing the stored request identifiers with the received response identifiers.

The device also comprises a function library unit 510 which is adapted to provide the processing unit with functions for serving information requests from the application. The function library also comprises an assigning unit 512 which is adapted to assign request identifiers to the requests received from the processing unit. The communication with the processing unit is executed through a communication interface 516. A decoder 514 is adapted to decode response signals forwarded to the function library from the processing unit. The encoded response signals are responses to requests made by the application which are forwarded to the processing unit 502, as indicated by line 520.

The device comprises also an LDAP client module 518 which is adapted to forward requests from the application to the server and send responses from the server to the function library unit or the processing unit.

Communication between the processing unit, the function library unit, the client module and the server is shown by arrows 522.

The elements of the device as described above can be implemented as hardware or software or any combination of the two.

The above embodiments admirably achieve the objects of the invention. However, it will be appreciated that departures can be made by those skilled in the art without departing from the scope of the invention which is limited only by the claims.

The invention claimed is:

1. A method for accessing information in a directory by an application, comprising:
    sending a first request by the application for fetching information from a server without waiting for a response, wherein a function library handles the first request from the application for fetching the information from a server and wherein the first request is forwarded from the function library to the server by a client module;
    sending a request identifier from the function library to the application responsive to the first request being forwarded to the server;
    receiving a response signal from the server to the first request by the application, wherein the response signal comprises a response identifier;
    when the response identifier matches the request identifier, correlating the response signal to the first request;
    calling by the application of a function from the function library for decoding the response signal; and
    returning the decoded response signal from the function library to the application.

2. The method of claim 1, wherein the application stores an association of the request identifier and the first request and wherein the association is used to match the response to the first request.

3. The method of claim 1, wherein the function library comprises at least one function for an asynchronous handling of further requests from the application.

4. The method of claim 1, wherein the response signal is received in a signal queue of the application.

5. The method of claim 1, wherein the directory contains a plurality of entries and wherein an entry comprises a collection of attributes.

6. The method of claim 1, wherein the directory is spread over a plurality of servers.

7. The method of claim 1, wherein the request identifier is sent from the client module to the server and wherein the response identifier in the response signal is the request identifier.

8. A device for accessing information in a directory, the device comprising:
    a processing unit adapted to execute at least one application, wherein the application is adapted to send a first request for fetching information to a server without waiting for a response;
    a function library unit comprising at least one function for handling the first request from the application; and
    a client module for forwarding the first request from the application to the server;
    wherein the function library unit is configured to assign a request identifier to the first request and includes an interface adapted to forward the request identifier to the application responsive to the first request to the server being forwarded and a decoder for decoding a response signal to the first request received by the processing unit; and
    wherein the processing unit comprises:
        an interface adapted to receive a response signal comprising a response identifier from the server;
        a memory for storing the request identifier; and
        a comparator unit adapted to compare the response identifier to the request identifier for matching the response signal to the first request.

* * * * *